Stanley Rawlings Detrick
William Howard Lockwood
Nelson Whitman
INVENTORS

BY David Katz ATTORNEY

Stanley Rawlings Detrick
William Howard Lockwood  INVENTORS
Nelson Whitman
BY

David Katz, ATTORNEY

Patented Feb. 22, 1949

2,462,730

UNITED STATES PATENT OFFICE 2,462,730

PREPARATION OF POLYSULFONYL CHLORIDES

Stanley Rawlings Detrick, New Castle County, William Howard Lockwood, Wilmington, and Nelson Whitman, New Castle County, Del., assignors to E. I. du Pont de Nemours & Company, Wilmington, Del., a corporation of Delaware Application August 23, 1944, Serial No. 550,832

1 Claim. (Cl. 204—163)

This invention relates to the preparation of organic sulfonyl chlorides and more particularly to the preparation of aliphatic polysulfonyl chlorides in a continuous manner.

This invention has as an object an improved method for the preparation of aliphatic polysulfonyl chlorides in a continuous manner. It has as a further object the provision of a process whereby saturated aliphatic hydrocarbon sulfonyl chlorides may be continuously prepared economically and in a relatively pure form.

In U. S. Patent No. 2,193,824 is described a process for producing organic sulfonyl chlorides by the continuous reaction of organic compounds with a mixture of sulfur dioxide and chlorine passed upwards into a reaction cylinder, countercurrent to the general flow of the liquid reaction mass. The process disclosed therein, although of great advantage in general, is not satisfactory when the polysulfonyl chlorides of an aliphatic hydrocarbon are to be produced. In general the polysulfonyl chlorides of an aliphatic hydrocarbon are not miscible with the pure hydrocarbon itself. As a result when the process of U. S. Patent No. 2,193,824 is applied to the manufacture of aliphatic polysulfonyl chlorides, a separation of phases occurs which seriously decreases the efficiency of the reaction. This is due to the fact that there is sufficient circulation in the reactor to mix the upper fresh hydrocarbon with the aliphatic sulfonyl chlorides at the bottom of the reactor. This mixing is inherent in the type of column disclosed due to the convection currents produced as the gases travel from the bottom of the reactor to the top. This phenomenon takes place even though the column is packed.

Such a separation into phases is very injurious to the process for two reasons: In the first place, the introduced physical heterogeneity renders the mass opaque and impedes penetration of the mass by the actinic radiation so essential to the reaction. In the second place, we have observed that the originally minute bubbles of the gaseous mixture of $SO_2$ and $Cl_2$ have a tendency to coalesce into large bubbles in the heterogeneous region, thereby cutting down the surface-to-volume ratio of each bubble and hence reducing the area of contact between gas and liquid. For some reason which is not clearly understood such coalescence occurs to a much greater degree in regions where the liquid is heterogeneous than at all other points. In due course, the heterogeneous, opaque region spreads throughout the volume of the reaction mass and the rate of reaction drops down to a very low value.

Now according to this invention, the above difficulty is overcome by carrying out the continuous reaction in such a manner or in such apparatus that the hydrocarbon entering the reaction chamber in liquid state is subjected to the action of the gaseous mixture in a series of consecutive zones or stages, allowing no opportunity for the liquid mass in the early stages to come in contact with the liquid mass in the more advanced or final stages.

We have found that separation into liquid phases does not take place if the difference in chemical composition between two such stages is not very great. For example, if a hydrocarbon is treated until it absorbs an average of two $SO_2Cl$ groups per molecule, with more than 80% of the initial material having become so converted, the resulting mass will not mix with any substantial quantities of the initial hydrocarbon. If, however, the reaction is carried only to the point where about 40% of the initial hydrocarbon has been converted into $SO_2Cl$ compounds, the reaction mass will mix with large additional quantities of the hydrocarbon, without breaking up into phases. Apparently, there exists a maximum tolerable difference in chemical composition, which if surpassed causes the two liquid masses to become incompatible. Consequently, our invention aims generally to effect the conversion of the hydrocarbon in a series of stages (or in a continuously changing zone) in such a manner that free mingling is permitted only between stages or zones whereof the difference in chemical composition is below an assumed safe value, say the hydrocarbon content does not drop off by more than 40% of its original value from one stage to the next, and in this fashion we preserve physical homogeneity throughout the reaction chamber.

In the preferred form of our invention, we employ an apparatus in which the selected aliphatic organic compound in the liquid state is passed horizontally through a reactor in which multiple streams of a gaseous mixture of sulfur dioxide and chlorine are passed through the liquid in a vertical direction. In this manner the aliphatic polysulfonyl chlorides are formed continuously as the aliphatic compound progresses transversely from one end of the reactor to the other. The reactor is either packed or baffled so that free commingling of the effluent aliphatic polysulfonyl chlorides with the aliphatic compound being fed to the reactor is prevented.

The reactor may be made from any suitable corrosion resistant material, such as glass, ceramic ware, nickel or nickel alloys. It is so disposed that a relatively shallow depth of aliphatic compound is exposed to the action of the gaseous sulfur dioxide and chlorine. The gases are introduced at the bottom of the reactor in multiple streams. This may be achieved by using a false bottom of a porous material, preferably ceramic, through which the gases are bubbled. The gases are supplied to the underside of this floor under sufficient pressure to maintain a steady flow and to prevent any substantial downward seepage of the liquid reaction mass.

The length and width of the reactor may be of any convenient size, depending on the desired capacity. It is preferable, however, that the reactor have a high length-to-width ratio since this aids in preventing commingling of the raw material and the finished product. The reactor may also be fitted with packing such as transparent, glass Raschig rings. It may also be baffled so as to require the reacting mass to pass within a relatively narrow channel and thus set up a more rapid rate of flow through the reaction zone.

It is necessary to furnish actinic light for the reaction. This may be introduced through light wells immersed in the reactor or through transparent windows in the sides of the reactor.

For a clearer understanding of our invention, reference is made to the accompanying drawings, in which Figures 1 and 2 represent in diagram vertical sections of two different modifications of the reactor according to this invention.

Figures 3 and 4 together represent a third modification, Figure 3 being the diagram of a vertical section, while Figure 4 repersents a plan view on line 4—4 of Figure 3.

Figure 1:
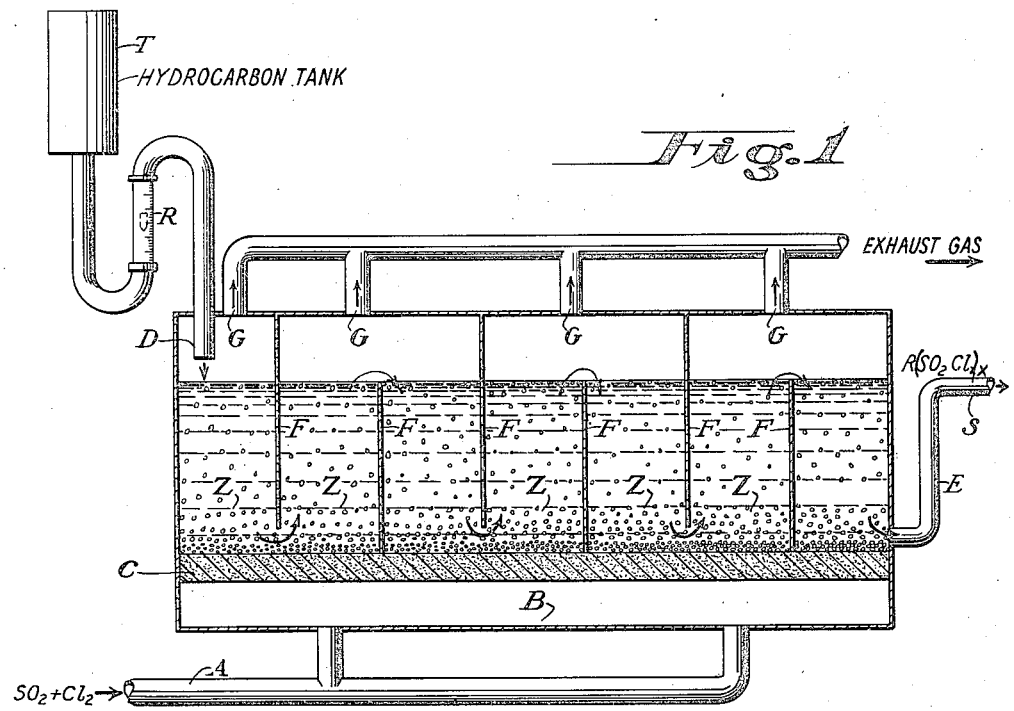
Figure 5:
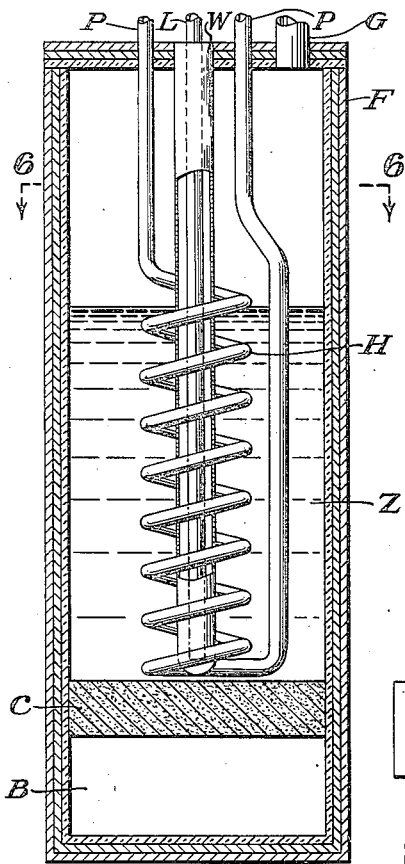
Figure 5 is an enlarged, detailed sketch, in vertical section, of one of the zones Z shown in Figures 1 and 3.
Figure 6:
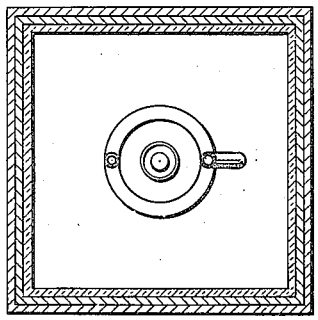
Figure 6 is a horizontal section of Figure 5, along the line 6—6.
Figure 3:
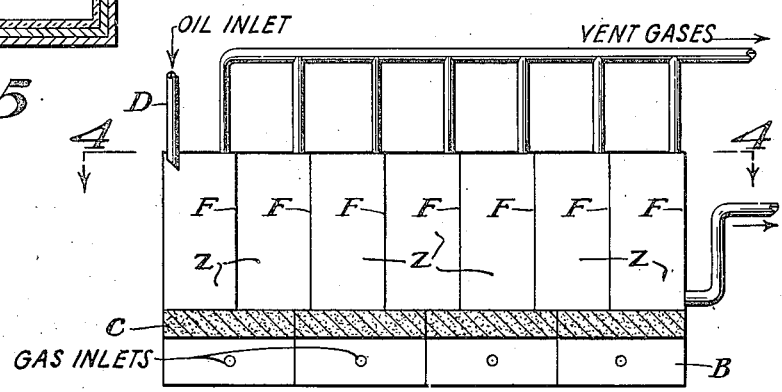

In Figure 1 a gaseous mixture of sulfur dioxide and chlorine is fed through the manifold A into the gas chamber B. This gas chamber may or may not be divided into sections (as shown in Figure 3 for instance) each of which may be fed independently with mixed gases. The gases then pass through the porous block C into the reaction zones Z, Z. The details of each reaction zone Z are shown in Figures 5 and 6. Each such zone is provided with a glass light-well W dipping vertically into the reaction mass, into which is inserted a fluorescent lamp L. Each zone further contains means for cooling the reaction mass, such as the helical coil H, H, preferably surrounding the light-well and receiving and discharging water or other cooling medium through pipes P, P.

The reactor may be constructed of any suitable corrosion-resistant material, while the porous bottom is best made of porous ceramic material such as "Filtros" (a commercial form of porous ceramic material) or sintered glass.

Hydrocarbon oil from the container T is passed through the flow measuring device R and fed into the first reaction zone Z through the inlet pipe D. The reaction zones Z, Z are suitably illuminated with actinic light, as shown in Figure 5. The hydrocarbon passes continuously under and over the baffles F, F to the exit line E. The exhaust gases from the reaction zones Z, Z pass out through the exit lines G, G into a manifold, and are vented. The reacting mass is cooled by cooling coils H immersed in the reaction zones, as shown in Figure 5. If desired, the walls of the reactor may be jacketed for cooling and the baffles may be so designed that a coolant may be circulated through them. The rate of passage of hydrocarbon into the reactor is controlled so as to give the desired specific gravity at S, being faster if a small increase in specific gravity is desired and slower if a large increase in specific gravity is required.

Figure 2:
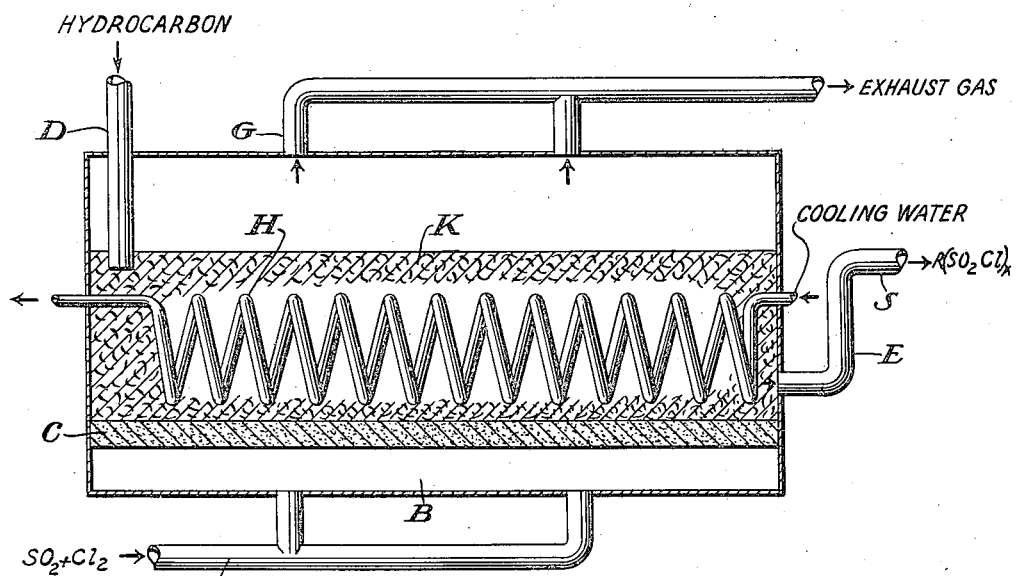

In Figure 2 the baffles have been removed and replaced by glass packing K. This prevents the circulation of the charge from one end of the reactor to the other through convection currents and at the same time gives added contact between the gases and the reacting liquid. In this modification, the reaction is effected in a single compartment. A single helix H may replace the several cooling coils of Figure 1, and the fluorescent lamp with its light-well may be placed horizontally inside this helix, but have been omitted from the drawing for clearness.

Figure 4:
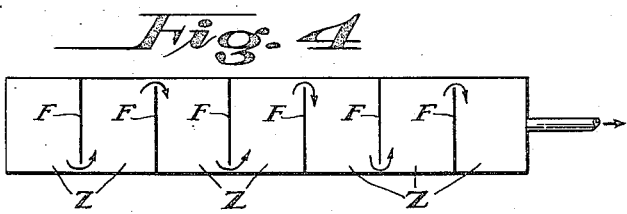

In Figure 3, the baffled reactor has all the baffles reaching from the surface of the porous block to the ceiling of the reaction chamber, and passage of the reacting mass is permitted by a narrow slot on one side of each baffle, the successive baffles carrying the slots on opposite sides, as shown in the top view in Figure 4. These slots are preferably limited in height to a point below the intended level of the liquid reaction mass, whereby backing up of the foam from the last compartment Z to the earlier zones is prevented. The internal structure of each zone Z may be the same as in the modification of Figure 1; in other words, each contains a light-well, fluorescent lamp and cooling coil, as shown in detail in Figures 5 and 6. In this type of reactor the reacting mass meanders from one side of the reactor to the other, instead of from top to bottom and return as in Figure 1. In either case, if no packing is employed, a minimum of four baffles has been found desirable to insure that no resolution into phases takes place through contact of the fresh hydrocarbon with the polysulfonyl chloride already formed.

The dimensions of the above apparatus may vary within wide limits, and will generally be guided by the following considerations: The rate of admission of the gaseous mixture from the manifold underneath the reaction chamber is determined by the porous nature of the floor of the chamber. The rate is further determined by the area of the porous floor.

The height of the apparatus is so chosen as to enable the chloride component of the entering gaseous mixture to be totally absorbed in the liquid reaction mass. A depth of the latter of about 5" to 7" is generally sufficient when an ordinary porous ceramic floor is employed. But the depth may exceed this minimum practically without limit, if found desirable.

The length of the apparatus should be sufficient to accommodate the various baffles and compartments, and to separate sufficiently the initial stages of reaction from the final stages to avoid free mingling where no baffles are employed. Satisfactory results are obtained if the length is from 2 to 10 times the width of the apparatus.

When the dimensions of the apparatus are fixed, the rate of flow of liquid hydrocarbon through it will of course be determined by the hydraulic head between the intake and outlet, and this rate in turn determines the period of contact between liquid and gaseous mixture and through it the degree of conversion. The latter can be measured by determining the specific gravity of the reaction mass at the outlet, since the specific gravity continually rises as the degree of conversion progresses. By degree of conversion, we mean to embrace the effect of both percentage of initial material converted into sulfonyl derivatives and the average number of $SO_2Cl$ groups introduced per molecule in the portion converted. Both effects are roughly indicated by the average sulfur (and/or chlorine) analysis of the final mass.

Without limiting our invention, the preparation of aliphatic polysulfonyl chlorides is illustrated by the following examples in which the dimensions and weights are merely typical and may be increased at will as long as the proper relative magnitudes are maintained between them.

Example 1

A reactor similar to that in Figure 2 was used in the preparation. The bottom of the reactor was made of a porous siliceous block approximately 20 in. long, 2 in. wide, and 1 inch thick. The sides of the reactor were of glass and extended approximately 10 in. above the top of the porous block. Cooling was provided by a glass coil heat exchanger. The reactor was packed to a height of 6½ in. with transparent glass beads. Into one end of the reactor was introduced per hour 624 gms. of a white oil manufactured from a Pennsylvania crude petroleum and having a distillation range of 265 to 305° C. and a specific gravity of 0.801 at 15.5° C. compared with water at 15.5° C. and a Saybolt Universal viscosity of 37 seconds at 100° F. At the same time there was introduced into the reactor through the porous block a gaseous mixture of 958 gms. of sulfur dioxide and 740 gms. of chlorine per hour. The reaction was irradiated with light from two mercury vapor fluorescent lamps of a type which emits the bulk of its radiation between 3000 and 4000 Angstroms. Cooling was provided by passing water at 15° C. through the cooling coils. The reaction mass was held at a temperature of 40-45° C. There was obtained from the effluent end of the reactor 1280 gms. of aliphatic polysulfonyl chloride per hour. A portion of this sulfonyl chloride was hydrolyzed with a 50% sodium hydroxide solution to convert the sulfonyl groups to the corresponding sodium sulfonate groups. There was obtained thus an aliphatic sodium sulfonate solution which showed good detergency in salt water. The product contained about two sulfonate groups per molecule of hydrocarbon.

Example 2

The reactor of Example 1 was modified by replacing the glass bead packing with lengths of glass tubing which were cut 10 to 15 mm. long from 5 mm. Pyrex tubing. (Pyrex is a commercial type of boro-silicate glass.) Into one end of the reactor was added, at a rate of 866 gms. per hour, a refined paraffin wax (123 to 125° F. American melting point), while there was passed through the porous block a gaseous mixture of 932 gms. of sulfur dioxide and 720 gms. of chlorine per hour. The paraffin wax polysulfonyl chloride thus was formed at a rate of 1195 gms. per hour. The temperature was maintained at 70 to 75° C. during the reaction by passing cooling water through the coils at 51 to 52° C. During the reaction 3 cc. per hour were added of a mixture of dialkyl phosphates (having 10 to 16 C-atoms per alkyl radical), to diminish the foam. The same lights were used to irradiate the reaction zone as were used in Example 1. 500 gms. of the sulfonyl chloride thus formed were hydrolyzed with 233 gms. of a 60% sodium hydroxide solution. There resulted 718 gms. of a viscous paste which exhibited good salt water detergency when blended with soap to form an all-purpose soap bar. The sodium sulfonate so obtained contained an average of two sulfonate groups per paraffin wax molecule.

Example 3

The same type of reactor was used as in Example 1 except that it was packed with 1 to 1½ centimeter lengths of 5 mm. glass tubing to a depth of 7 in. The same actinic light was used as in Example 1. The following rates of flow were maintained through the reactor: 747 gms. per hour of a Pennsylvania paraffinic white oil boiling from 265 to 305° C., 850 gms. per hour of sulfur dioxide and 691 gms. of chlorine. The resulting effluent aliphatic polysulfonyl chloride was collected at a rate of 1706 gms. per hour. This effluent aliphatic polysulfonyl chloride was continuously hydrolyzed by adding it to a vessel accompanied with very efficient agitation simultaneously with 1051 gms. per hour of a 50% sodium hydroxide solution. There were obtained 2778 gms. of hydrolysis mass containing 46.5% sodium aliphatic polysulfonate.

Example 4

The use of the reactor described in Example 3 is not limited to the preparation of aliphatic polysulfonyl chlorides but may also be used in the preparation of aliphatic monosulfonyl chlorides. In this case it is only necessary to pass the aliphatic hydrocarbon through the reactor at such a rate that only a part of the hydrocarbon is reacted. When the oil defined in Example 1 was passed through the reactor at a rate of 6950 gms. per hour and sulfur dioxide was passed through at a rate of 1013 gms. per hour and chlorine at a rate of 899 gms. per hour, the effluent sulfonyl chloride was collected at a rate of 7642 gms. per hour. Approximately 25% of the hydrocarbon passed through the reactor was converted to an aliphatic sulfonyl chloride. This aliphatic sulfonyl chloride-hydrocarbon mixture was hydrolyzed with 30% sodium hydroxide solution. The process was carried out continuously and the sodium hydroxide was fed at a rate of 360 gms. per hour. The crude hydrolysis mass thus obtained was diluted with 1.2 times its weight of water and with ethyl alcohol equal to one-tenth of the volume of water. On standing the unreacted hydrocarbon separated as an upper layer. After withdrawing the aqueous layer of sodium aliphatic sulfonate, the upper hydrocarbon layer was available for recycling through the reactor for further reaction.

Example 5

The preparation of Example 4 was repeated except that an aliphatic hydrocarbon having a distillation range of 212 to 252° C., a specific gravity at 15.5° C. of 0.781 and free of aromatic and unsaturated bodies was used. The oil was passed through the reactor at such a rate that approximately 55% was converted to the aliphatic sulfonyl chloride. After hydrolysis to the sodium aliphatic sulfonate and separation of unreacted oil, as previously exemplified, the product was found to be an excellent surface tension depressant for strong electrolyte solutions.

*Example 6*

Into a reactor similar to that shown in Figures 3 and 4, there was passed, at the rate of 58 lbs. per hour, a saturated hydrocarbon fraction boiling between 263° C. and 305° C. and having a specific gravity of 0.801 at 15.5° C., and simultaneously there was passed through the porous floor blocks a gaseous mixture of 14.5 lbs. of sulfur dioxide and 12 lbs. of chlorine per hour. The temperature was maintained at 25–30° C. by passing cooling water through the cooling coils. The effluent reaction mass consisted of a mixture of hydrocarbon sulfonyl chlorides and unreacted hydrocarbon. The yield was 77 lbs. of this mixture per hour which had a specific gravity of 0.940 at 30° C.

In the above example, the reactor was 6 inches wide, 33 inches long and 12 inches deep. The average liquid level in the reactor, as estimated from the height of the take off, was 6 to 7 inches. The reactor shell was steel with an inner lead lining which in turn was lined with porcelain brick set in acid proof cement. The baffles, lightwells and cooling coils were of Pyrex glass. This type of construction is suitable also for larger units. The mixed gases were fed to the reactor through four independent inlets, as shown in Figure 3, so that the proportion of gas going through each of the four porous blocks could be better regulated.

It will be understood that the above examples are merely illustrative and that the details thereof may be varied within the skill of those engaged in this art.

In general, it is preferred to operate with an excess of sulfur dioxide over chlorine in order to minimize halogenation of the hydrocarbon. The process may be operated with an excess of chlorine over sulfur dioxide if halogenation of the hydrocarbon chain is desired simultaneously with the sulfonylation reaction. A practical range is from 1.1 moles of sulfur dioxide per mole of chlorine to 6 moles of sulfur dioxide per mole of chlorine. A preferred range is from 1.4 moles of sulfur dioxide to 2 moles of sulfur dioxide per mole of chlorine.

The temperature at which the reaction is carried out depends upon the melting point of the aliphatic compound being treated. Thus, with a paraffin wax melting at 50° C., a temperature range of 60 to 65° C. in the reaction zone is preferable. while with a liquid hydrocarbon such as described in Example 1 the temperature of the reaction zone may well be maintained as low as 10° C. We have found that lower temperatures have a tendency to minimize the extent of hydrocarbon halogenation.

The process may be carried out under elevated pressure or under vacuum according to the requirements of the process. However, it is preferable to operate at atmospheric pressure, as this minimizes the mechanical complications.

The reaction requires actinic light. In addition to the sources of light described in the foregoing examples, we have found that fluorescent mercury vapor lamps emitting a majority of their radiations between 3800 and 6000 Angstroms are also of value in the reaction. Likewise daylight fluorescent lamps furnish satisfactory actinic radiation for the reaction. There may also be used ordinary electric lamps, other vapor lamps, such as rare gas and metal vapor lamps, arc lamps, salt cored arc lamps, etc. The radiation of direct sunlight is also satisfactory for the reaction.

Our improved process is not limited to the aliphatic compounds described in the examples but is applicable broadly to saturated aliphatic hydrocarbons and their derivatives, for example normal alkanes as described in U. S. P. 2,174,507, isoalkanes as described in U. S. P. 2,174,508, alicyclic hydrocarbons as described in U. S. P. 2,174,505, U. S. P. 2,174,506 and U. S. P. 2,174,509, purified aliphatic hydrocarbons as described in U. S. P. 2,197,800, higher molecular weight aliphatic hydrocarbons as described in U. S. P. 2,263,312. In addition long chain alcohols, ketones, fatty acids and fatty acid esters such as disclosed in U. S. P. 2,193,824 may also be used.

Where the compound to be sulfonylated is not liquid or readily liquefiable, it may be treated in solution in an organic liquid which is inert toward the $SO_2 + Cl_2$ mixture. As convenient solvents for this purpose may be mentioned carbon tetrachloride, tetrachlorethane and ethylene dichloride.

The hydrolysis of the aliphatic polysulfonyl chlorides obtained is not limited to the use of sodium hydroxide. In general, the hydrolysis may be carried out with concentrated solutions of other alkali or alkaline earth metal hydroxides or carbonates. Furthermore, organic amines may also be used such as methylamine, diethylamine, aniline, cyclohexylamine, triethanolamine, morpholine, etc. It is necessary that sufficient water be present when these amines are used to carry out the hydrolysis reaction.

This continuous process may be coupled with other continuous processes so that the formation of a finished surface active material may be made continuous. Thus, the material may be continuously reacted, continuously hydrolyzed, continuously diluted with water (and, if necessary, a small amount of ethyl alcohol), passed to a continuous centrifuge where the unreacted hydrocarbon is removed, the aqueous phase being then continuously extracted with a solvent capable of dissolving any remaining unreacted hydrocarbon, and then continuously steam distilled to remove any unsaturated solvents or continuously standardized with inorganic salts and continuously drum dried. These latter processes are disclosed in U. S. Patents 2,228,598, 2,239,974 and 2,276,090.

In one sense the baffled reactor of Figure 1 or 3 may be considered a series of small reactors having a common wall. If desired, a series of small independent reactors may be set up to perform the same operation. Thus, if there are four baffles in the reactor it is equivalent to five independent reactors in series. Therefore, the baffled reactor may be replaced by apparatus which consists of five chambers having porous blocks attached to the bottoms for introduction of gases, and being equipped with cooling coils and light wells on the inside. Or, if desired, the chambers may be built with glass walls, and the light may be passed in from the outside. The chambers may be arranged in cascade so that the liquid effluent of one becomes the feed of the next following, but each one is supplied with fresh gas through its own porous bottom. We have prepared polysulfonyl chlorides of hydrocarbons in such a series of chambers comprising two, four, and five cylinders in the units. We prefer to have a minimum of four such cylinders or individual compartments in such a reactor to prevent resolution into phases in any one compartment due to a sharp difference in composition between the two stages meeting in such compartment.

The improvements resulting from our novel process and apparatus compared to the practice of the prior art will now be readily apparent. Thus, when the reaction of liquid hydrocarbons of the above types with a gaseous mixture of $SO_2$ and $Cl_2$ is carried out continuously in the manner set forth in U. S. Patent No. 2,193,824, or in other conventional types of reactors, it is found that a separation into two immiscible phases takes place. When this separation into immiscible phases occurs, the distribution of the gaseous sulfur dioxide and chlorine reactants within the reaction zone is seriously disrupted. Instead of obtaining a flow of small bubbles through the reaction zone, there is a coalescence near the point of gas entry so that large masses of gas are formed which rise through the reaction zone and have a very small surface to volume ratio.

Now, when the process is carried out according to the present invention, the effective flow of oil is perpendicular to the flow of gases and the depth of liquid in the reaction zone is relatively shallow as compared with prior art reactors. Thus, as the reacting hydrocarbon passes from one end of the reactor to the other, it becomes progressively more highly sulfonylated, but within the space adjacent any given vertical section no extreme differences in chemical composition are to be found. The convection currents created by the rising gases do not therefore have any tendency to mix more highly reacted portions with less highly reacted portions. As a result, it is possible to carry out the reaction on an aliphatic hydrocarbon to such an extent that the ultimate reaction product is not miscible with the starting hydrocarbon, yet without creating a zone in which there exist two immiscible phases.

Our invention thus results in improved yields and more efficient utilization of the $SO_2$ and $Cl_2$ gases. Our experiments and experience have demonstrated that it requires more than twice as much sulfur dioxide and chlorine to produce a given degree of sulfonylation when two immiscible phases are present as when carried out in accordance with this invention. Furthermore, a more uniform quality of product is obtained by this invention than when the two immiscible phases are reacted. In the latter case there appears to be a greater proportion of more highly sulfonylated hydrocarbons to essentially unsulfonylated hydrocarbons, than in the products obtainable by our improved method.

In the claims below where we speak of a specified reactant "in liquid state" we mean to include under said phrase the liquid or molten state of the pure reactant as well as its state of solution in another liquid. Also, the term "actinic light" is to be understood as referring to light of which a substantial portion at least contains radiation of wave lengths between 3000 and 6000 Angstrom units.

We claim as our invention:

A continuous process for treating a saturated aliphatic hydrocarbon in liquid state with a gaseous mixture of sulfur dioxide and chlorine to produce a product having at least two sulfonyl groups per molecule, which comprises feeding said liquid hydrocarbon continuously into an elongated reaction zone which is subdivided into a series of communicating subzones following each other in an essentially horizontal line, whereby the liquid reaction mass is caused to move progressively from one subzone to the next until it traverses the entire reaction zone; irradiating said reaction mass with light of 3000 to 6000 Angstrom units as it moves along said reaction zone; and simultaneously admitting into the reaction zone said gaseous mixture of sulfur dioxide and chlorine in the form of a plurality of diffused streams moving in an essentially vertical direction, whereby each subzone is supplied directly with a portion of said gaseous streams, and whereby any turbulence caused by the motion of said gaseous stream through said liquid stream in any particular subzone will be confined to said subzone, so as to avoid intermingling between the incoming fresh hydrocarbon and outgoing polysulfonylated compound.

STANLEY RAWLINGS DETRICK.
WILLIAM HOWARD LOCKWOOD.
NELSON WHITMAN.

REFERENCES CITED

The following references are of record in the file of this patent:

UNITED STATES PATENTS

| Number | Name | Date |
|---|---|---|
| 1,345,431 | Cherry | July 6, 1920 |
| 1,554,296 | Ruben | Sept. 22, 1925 |
| 2,193,824 | Lockwood et al. | Mar. 19, 1940 |
| 2,202,791 | Fox et al. | May 28, 1940 |
| 2,265,163 | Herold et al. | Dec. 9, 1941 |
| 2,346,569 | Fox | Apr. 11, 1944 |